US009216699B2

(12) United States Patent
Flaherty (10) Patent No.: US 9,216,699 B2
(45) Date of Patent: Dec. 22, 2015

(54) LATERALLY SHIFTABLE BICYCLE FORK SKEWER (71) Applicant: Thule Sweden AB, Hillerstorp (SE)

(72) Inventor: Joseph Flaherty, Prospect, CT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 14/427,293

(22) PCT Filed: Sep. 10, 2013

(86) PCT No.: PCT/US2013/059070
§ 371 (c)(1),
(2) Date: Mar. 10, 2015

(87) PCT Pub. No.: WO2014/043130
PCT Pub. Date: Mar. 20, 2014

(65) Prior Publication Data
US 2015/0239403 A1   Aug. 27, 2015

Related U.S. Application Data (60) Provisional application No. 61/699,477, filed on Sep. 11, 2012.

(51) Int. Cl.
*B60R 9/048* (2006.01)
*B60R 9/10* (2006.01)
*B60R 9/058* (2006.01)

(52) U.S. Cl.
CPC . *B60R 9/10* (2013.01); *B60R 9/048* (2013.01); *B60R 9/058* (2013.01)

(58) Field of Classification Search
CPC ............ B60R 9/10; B60R 9/048; B60R 9/058
See application file for complete search history.

(56) References Cited

U.S. PATENT DOCUMENTS

| 3,828,993 | A | * | 8/1974 | Carter | B60R 9/048 211/22 |
| 4,964,287 | A | * | 10/1990 | Gaul | B62H 5/001 224/924 |
| 5,362,173 | A | * | 11/1994 | Ng | B60R 9/048 224/315 |
| 5,598,959 | A | * | 2/1997 | Lorensen | B60R 9/045 224/315 |
| 5,673,925 | A | * | 10/1997 | Stewart | B62K 25/02 280/279 |
| 6,062,450 | A | | 5/2000 | Noel et al. | |
| 2008/0053926 | A1 | | 3/2008 | Foley | |

OTHER PUBLICATIONS

International Search Report and Written Opinion of the International Searching Authority for International Appl. No. PCT/US2013/059070, European Patent Office, Rijswijk, Netherlands, mailing date of Nov. 12, 2013, 9 pages.

* cited by examiner

*Primary Examiner* — Brian D Nash
(74) *Attorney, Agent, or Firm* — Sterne, Kessler, Goldstein & Fox P.L.L.C.

(57) ABSTRACT

A bicycle fork anchor includes an anchor body which can have an interior space housing a skewer contraction device. The body can include a pair of skewer access ports. Also, the anchor body can include a pair of axially aligned elongate skewers, each extending through the access ports. The skewer contraction device can be operably coupled to the engagement portion of each of the pair of skewers. The skewer contraction device can be laterally moveable within the interior space of the anchor body so that during contractive operation of the skewer contraction device, the skewers draw together and simultaneously the skewer contraction device moves laterally within the interior space of the anchor body causing the skewers to extend different lengths outside the body and thereby accommodating reception of different thickness fork dropouts on the skewers.

22 Claims, 13 Drawing Sheets

FIG. 13

# LATERALLY SHIFTABLE BICYCLE FORK SKEWER

FIELD

The present disclosure relates generally to bicycle carriers. More specifically, embodiments within this disclosure relate to a mechanism configured to couple the bicycle fork to the carrier.

BACKGROUND

Load carriers, particularly regarding load carriers for mounting bicycles to a carrying vehicle, fork mounts or fork anchors can be utilized. The fork anchor serves as a securement for the front end of a bicycle to the load carrier in place of the front wheel. The typical configuration of bicycles incorporates a pivoting fork at the front of the bicycle used for steering the bicycle and which takes the form of an inverted "U" with the legs or prongs of the fork located on either side of the bicycle's front wheel. Each of the prongs terminates in a dropout which is a substantially inverted "U" shaped recess into the bottom of the prong which normally receives the axle of the front wheel of the bicycle. With the wheel removed, the two dropouts provide a ready-made point of connection to a load carrier. Traditionally, tightenable skewer arrangements have been provided in fork mount arrangements on carriers for securing a bicycle's fork to the carrier.

DETAILED DESCRIPTION

U.S. Pat. No. 6,062,450 provides an example of a fork mount securement arrangement. Therein, it is appreciated that the dropouts at the bottom end of the prongs of the forks into which the skewers attach may have different thicknesses. These inconsistencies in width or thickness are rarely purposeful, but instead are primarily a result of manufacturing inaccuracies, or the use of materials in which it is difficult to achieve exacting dimensions. Regardless of the reason, these different thicknesses of the dropouts make it more challenging to apply like pressure to each of the prongs at the respective dropout.

The challenge was solved in the '450 patent by providing two separate, location-fixed, but rotatable assemblies within the fork mount. Each assembly required manual operation that initially retracted, one each, of two separate skewer heads into engagement with the outside surfaces of the different thickness dropouts. A drawback of this skewer-contraction arrangement is that it requires a number of moving pieces that must be fixed within the fork anchor body, as well as requiring individual operator attention on each dropout just for presetting the position of the two different skewers before the securement pinch-force is applied. The end result is that the nature of the pinch-force that is ultimately applied to the two different dropouts, which is desired to be the same, is dependent upon the ability of the operator to set the two different skewers in the same orientation relative to the two different dropouts having different thicknesses. In practice, this is difficult to achieve, despite the exacting construction of the skewer contraction device. Therefore, the need for a more simply constructed skewer contraction device has been recognized that is self-fitting about a pair of fork prong dropouts having different thicknesses, and which then, in a simple manner, applies similar pinch-force securement pressure to the two dropouts to achieve a safe and secure transport configuration of the bicycle on the bike rack via the fork anchor.

Figure 1:
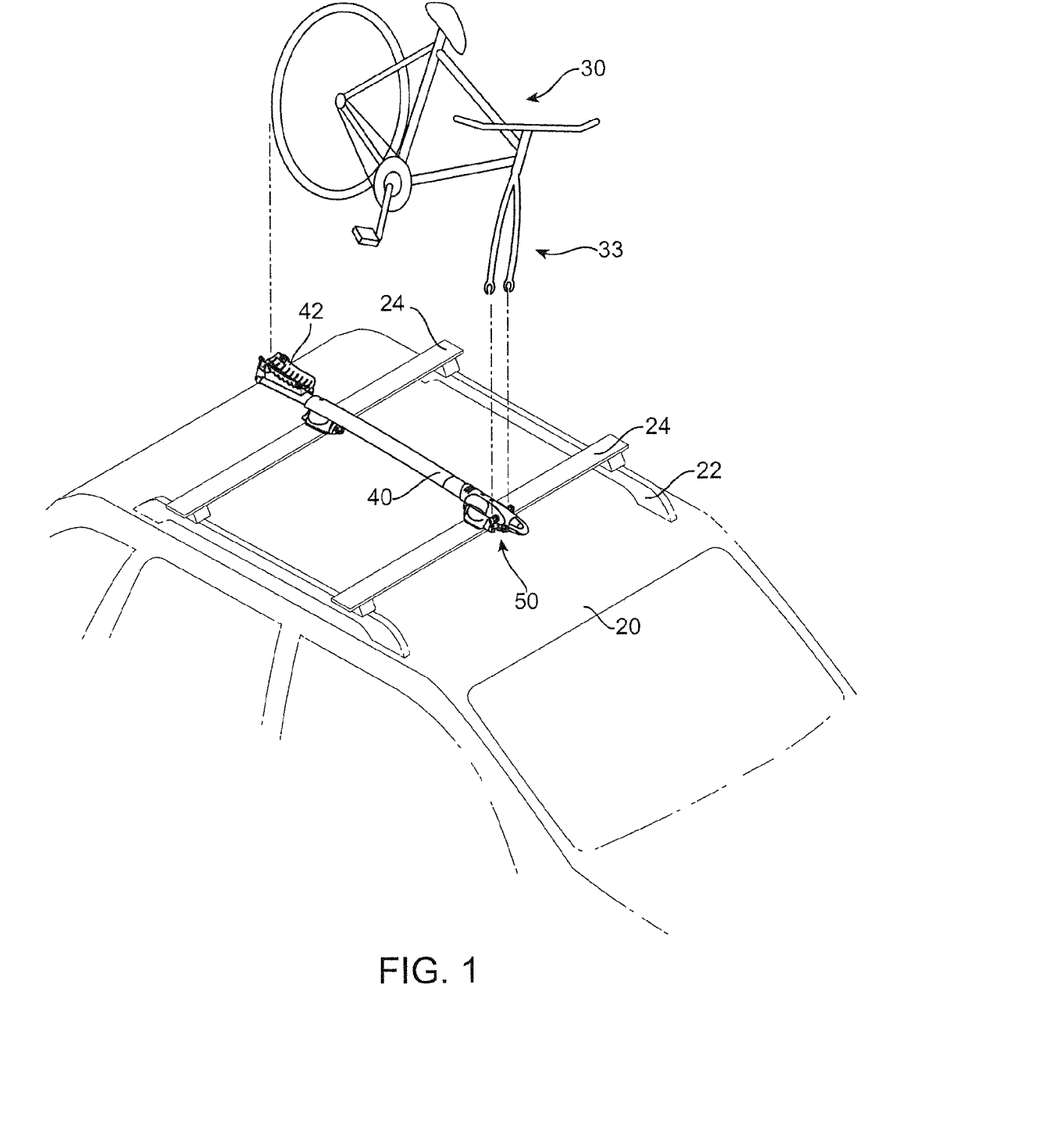
FIG. 1 is a perspective view of a bicycle carrier mounted to the roof rack of a carrying vehicle.

Referring to FIG. 1, a carrying vehicle 20 is shown having a roof rack 22 mounted thereupon. The rack 22 includes two crossbars 24 running laterally across the vehicle 20. Above the rack 22, is a bicycle 30 with its front wheel removed from the fork 33. The fork includes two fork prongs 36a and 36b, each of which has a dropout 38a and 38b of different thickness 39a and 39b as best appreciated in FIG. 3.

In FIG. 1, a load carrier in the form of a bicycle carrier 40 is shown mounted to the roof-top rack 22 of the vehicle 20 at each of the two crossbars 24. The bicycle carrier 40 has a long axis that is generally aligned with the long axis of the carrying vehicle 20. At the front of the carrier 40 is a bicycle fork anchor 50 and at the back end of the carrier 40 is a wheel tray 42.

Figure 2:
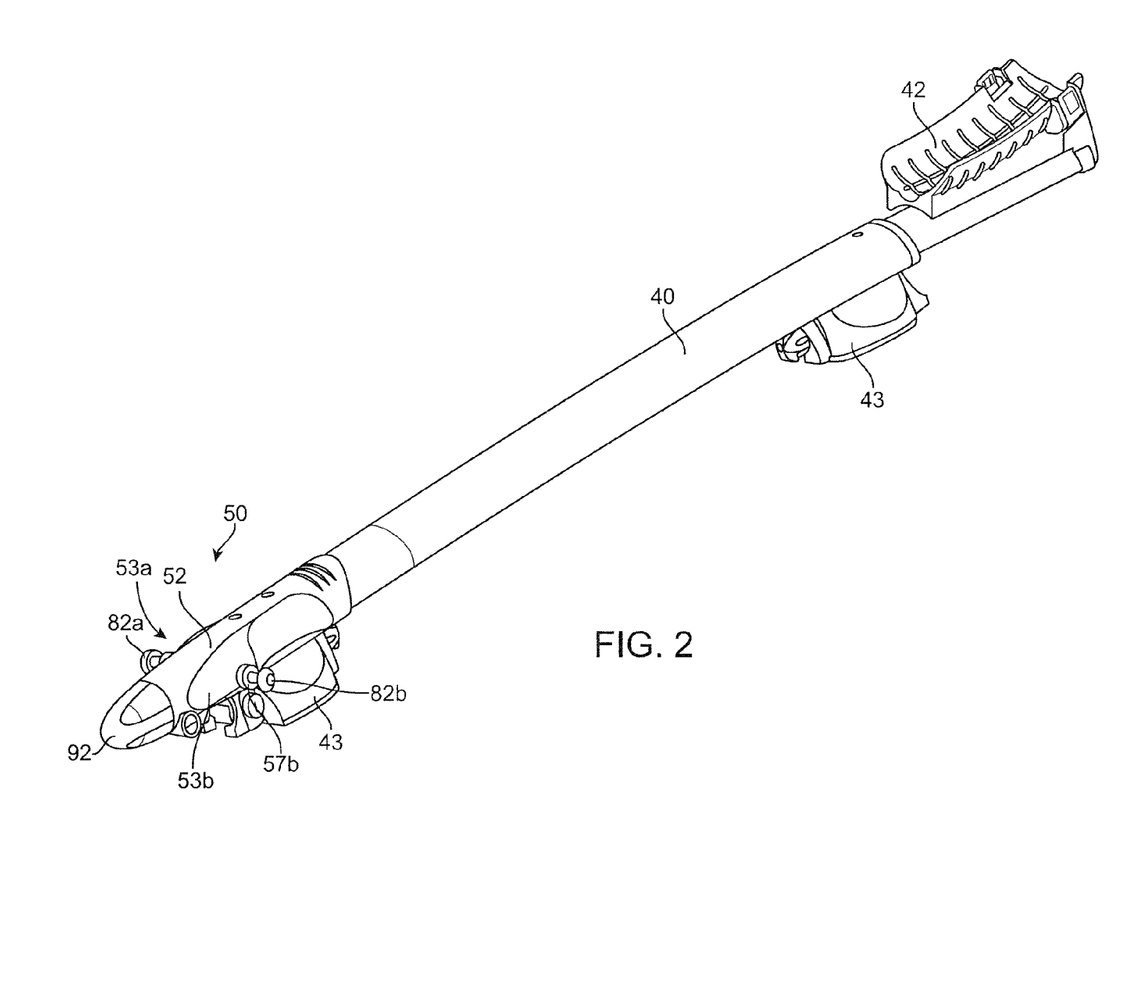
FIG. 2 is a perspective view of a bicycle carrier that includes a wheel tray and a fork anchor.

As can be better appreciated in FIG. 2, the bicycle carrier 40 includes two carrier feet 43 that are used to connect the body of the carrier 40 to the two different crossbars 24. As depicted, the elongate body of the carrier 40 is extendible and retractable in length. In the embodiment shown, extension and retraction is accomplished by a telescoping feature of a smaller-dimension back tube inserted into a complementarily shaped, but larger-dimension front tube. The bicycle fork anchor 50 is located at the front end (left end in FIG. 2) of the elongate carrier 40, generally above the front carrier foot 43.

The bicycle fork anchor 50 comprises (includes, but is not limited to) an anchor body 52 within which the primary motive features of the anchor 50 are housed inside an interior space 56 thereof. Lateral sidewalls 53a and 53b provide side boundaries to the enclosure of the interior space 56 of the anchor body 52. A prong abutment 57b is shown on the closest side wall 53b; a like prong abutment 57a is provided on the opposite wall 53a, but not shown in this view.

An operator graspable knob 92 is shown at the front end of the anchor body 52 that is used to control operation of a pair of skewers 80a and 80b having respective skewer heads 82a and 82b.

Figure 3:
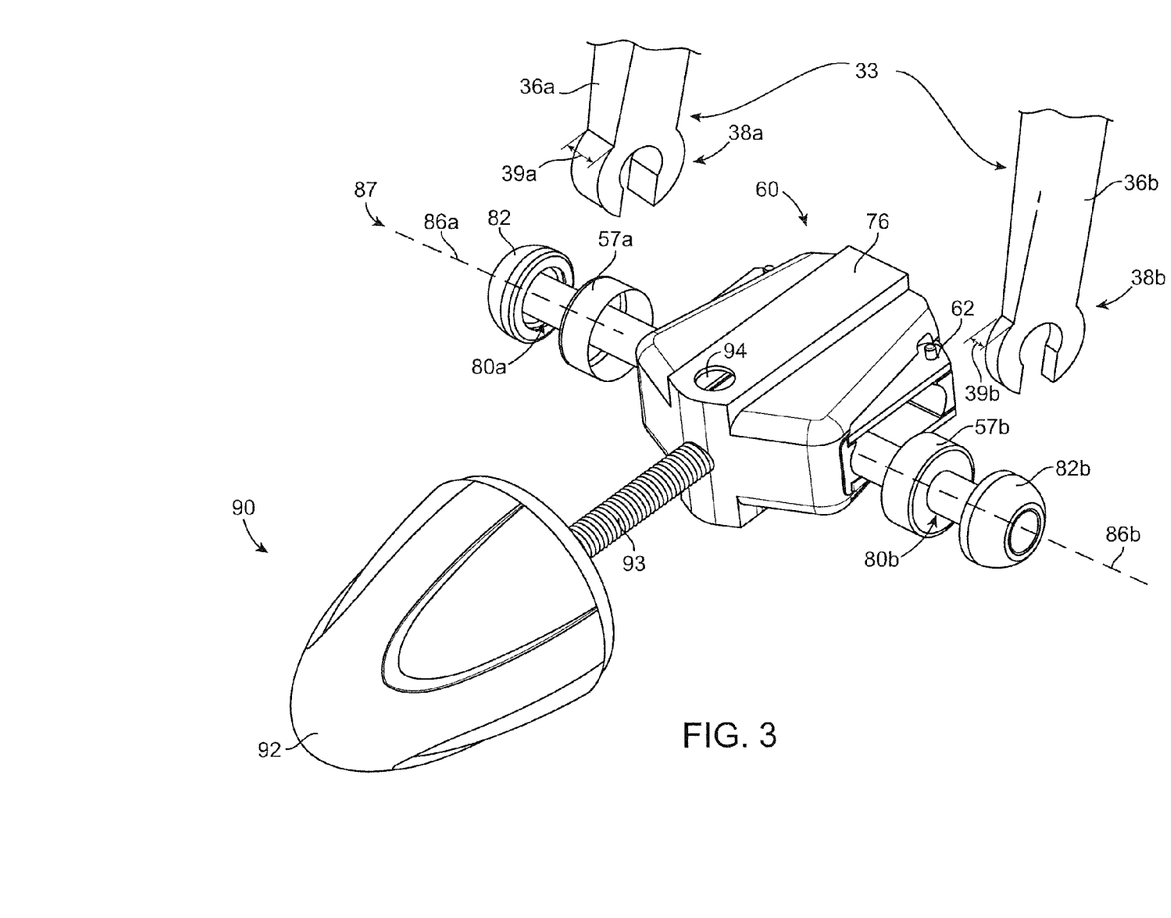
FIG. 3 is a perspective view of a skewer contraction device depicting a pair of bicycle fork prong dropouts having different thicknesses about to be installed on a pair of contractive skewers.

FIG. 3 shows transmission parts operated by the rotary actuator 90 that includes the operator graspable knob 92 which is connected to the externally threaded rod 93 for rotation thereof. The threaded rod 93 inserts into, and threadedly engages into the threaded barrel nut 94. The barrel nut 94 is received within, and journaled to the drive sleeve 76. When the rotary actuator 90 is manually rotated, the threaded rod 93 moves into and out of the drive sleeve 76 based on engagement with the barrel nut 94. As the operator graspable knob 92, and in turn the threaded rod 93, are in fact lengthwise anchored with respect to the anchor body 52, rotation of the threaded rod 93 actually results in forward and back reciprocation (right and left movement in FIG. 3) of the sleeve 76.

The sleeve 76 defines a cavity therein which forms a laterally directed track (relative to the anchor body 52) within which a skewer engagement carriage 62 of a skewer contraction device 60 reciprocates. Each of the pair of skewers 80a and 80b are coupled to the carriage 62 for affecting their extension and retraction relative to one another, as well as shifting right or left to accommodate different thicknesses 39a and 39b of the pair of dropouts 38a and 38b in the fork prongs 36a and 36b. As shown, each of the two skewers 80 are aligned with one another and have respective long axes 86a and 86b that together establish a skewer axis 87.

Figure 4:
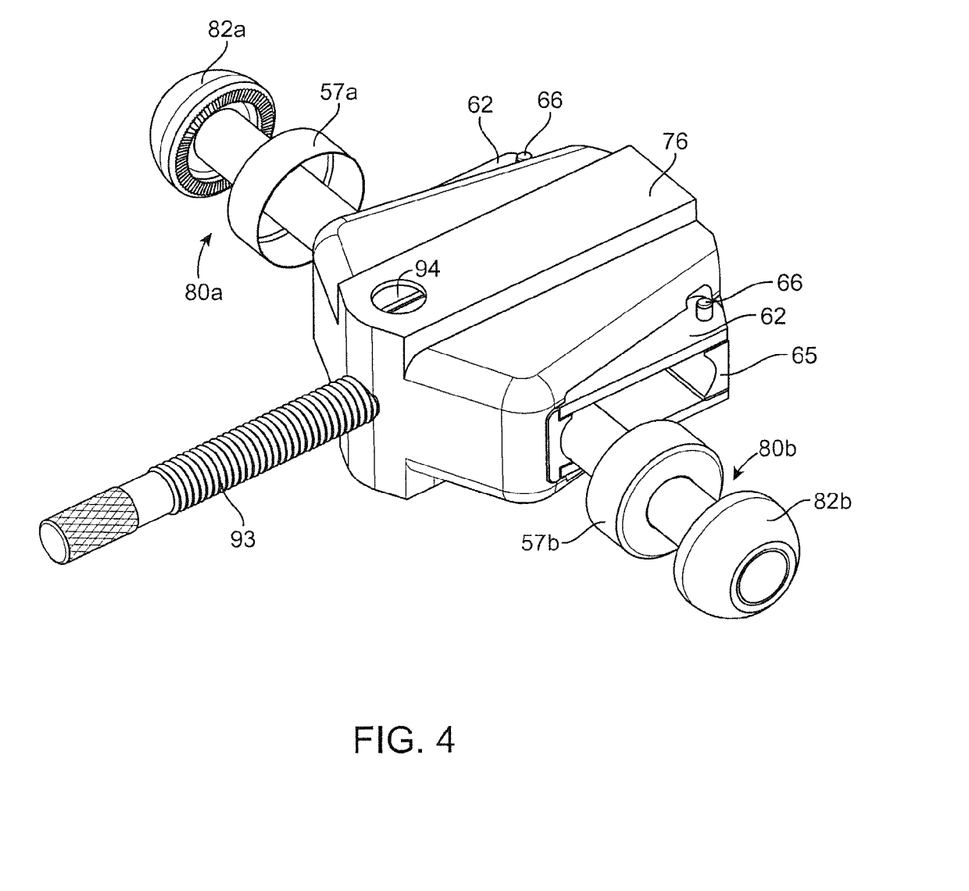
FIG. 4 is a perspective view similar to FIG. 3, but showing the drive sleeve and skewer engagement carriage in greater detail.

FIG. 4 shows a more detailed view of the skewer engagement carriage 62 inside the drive sleeve 76 for reciprocation therein. The threaded rod 93 is also shown with a knurled distal end for frictional engagement into a hub of the operator graspable knob 92. It should be appreciated that the prong abutments 57a and 57b are shown relative the skewers 80a and 80b, but are in fact part of the anchor body 52. The abutments 57 constitute a portion of the lateral side walls 53 through which the skewer access ports 58a and 58b extend. Preferably, the skewer access ports 58a and 58b take the form of substantially cylindrical channels within which respective skewers 80 reciprocate.

Figure 5:
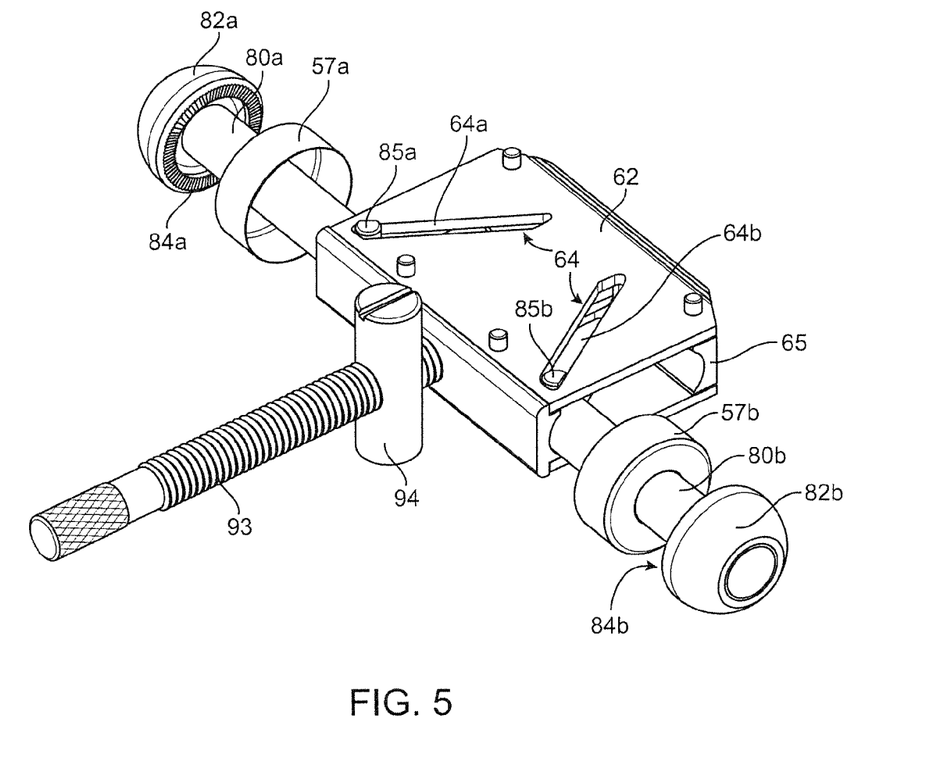
FIG. 5 is a perspective view showing the skewer engagement carriage in detail.

Compared to FIG. 4, FIG. 5 removes the drive sleeve 76 from about the skewer engagement carriage 62 exposing a pair of obliquely oriented tracks 64a and 64b that engage track followers 85a and 85b positioned on engagement portions 84a and 84b of the skewers 80a and 80b. As the skewers 80 are fixed relative to the anchor body 52, except for reciprocation and possibly rotation in the channels 58, it can be appreciated that movement of the carriage 62 to the left in FIG. 5 results in the pair of skewers 80 being drawn together. The opposite is true as well; if the carriage 62 is moved back to the right, the pair of skewers will be extended, one away from the other.

In FIG. 5, and interior face of the skewer head 82 is shown to be knurled or otherwise textured to foster frictional engagement between it and an embraced fork prong dropout 39 when pinch secured between the skewer head 82 and a corresponding prong abutment 57 of the anchor body 52.

Figure 6:
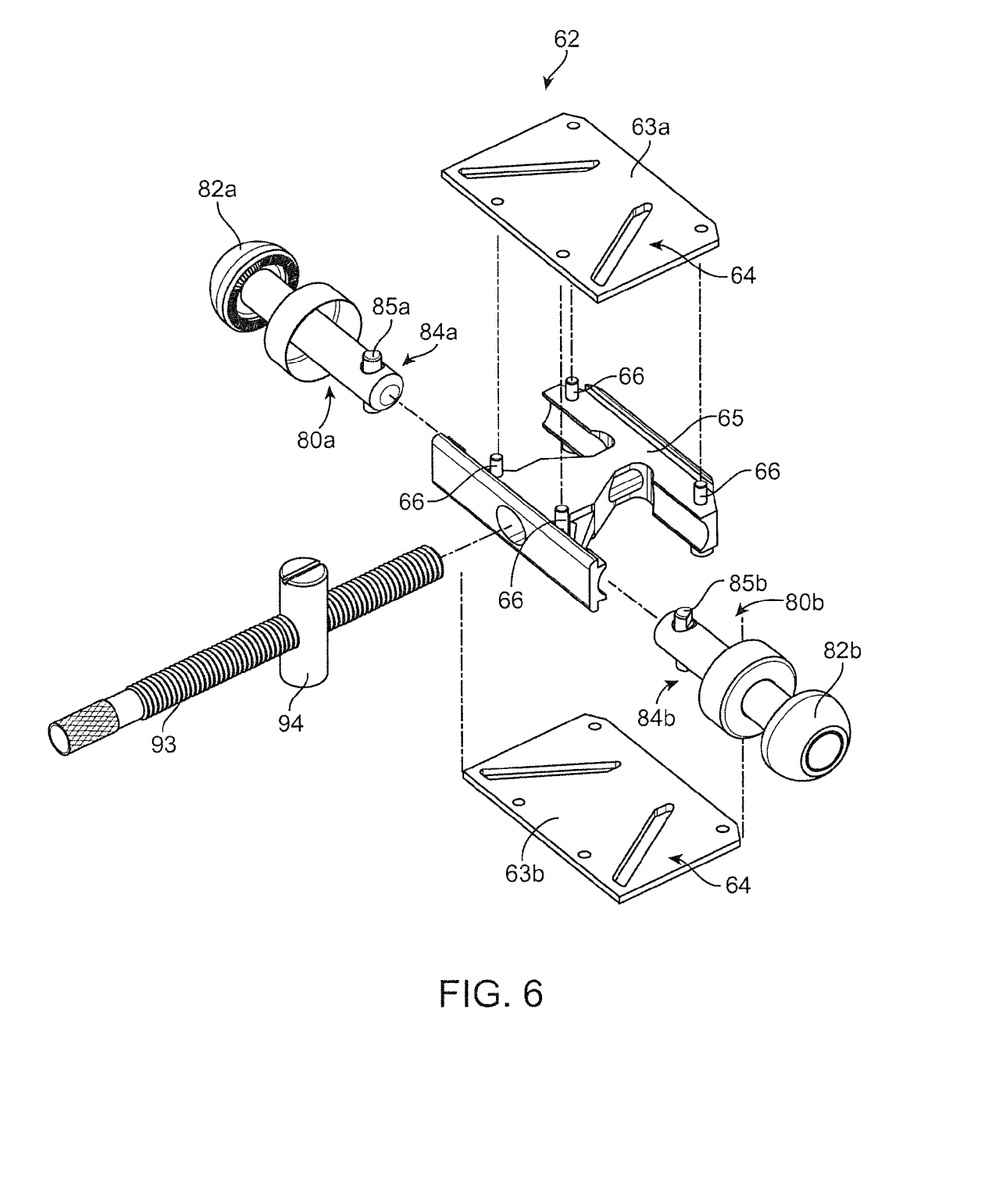
FIG. 6 is an exploded view of the skewer engagement carriage of FIG. 5.

FIG. 6 is an exploded view of that which is illustrated in FIG. 5 showing that the carriage 62 includes a chassis 65 sandwiched between a carriage top plate 63a and a carriage bottom plate 63b, which are all held together by fasteners 66 which can take the form of screws, rivets, adhesive or the like. In this depiction, it can be seen how the carriage 62 can be assembled so that the track followers 85 on the engagement portions 84 of the skewers 80 come to be inserted in the obliquely oriented tracks 64 upon assembly.

Alternatively, it is contemplated that an enlarged or expanded cutout may be provided at one end of a track 64. A track follower 85 can be rotated up, into the track at the larger end hole, and then moved down into the more narrow extension of the track 64 for reciprocation therein. When limited to reciprocation in the narrow portion of the track, the follower 85 is retained in the track 64.

Figure 7:
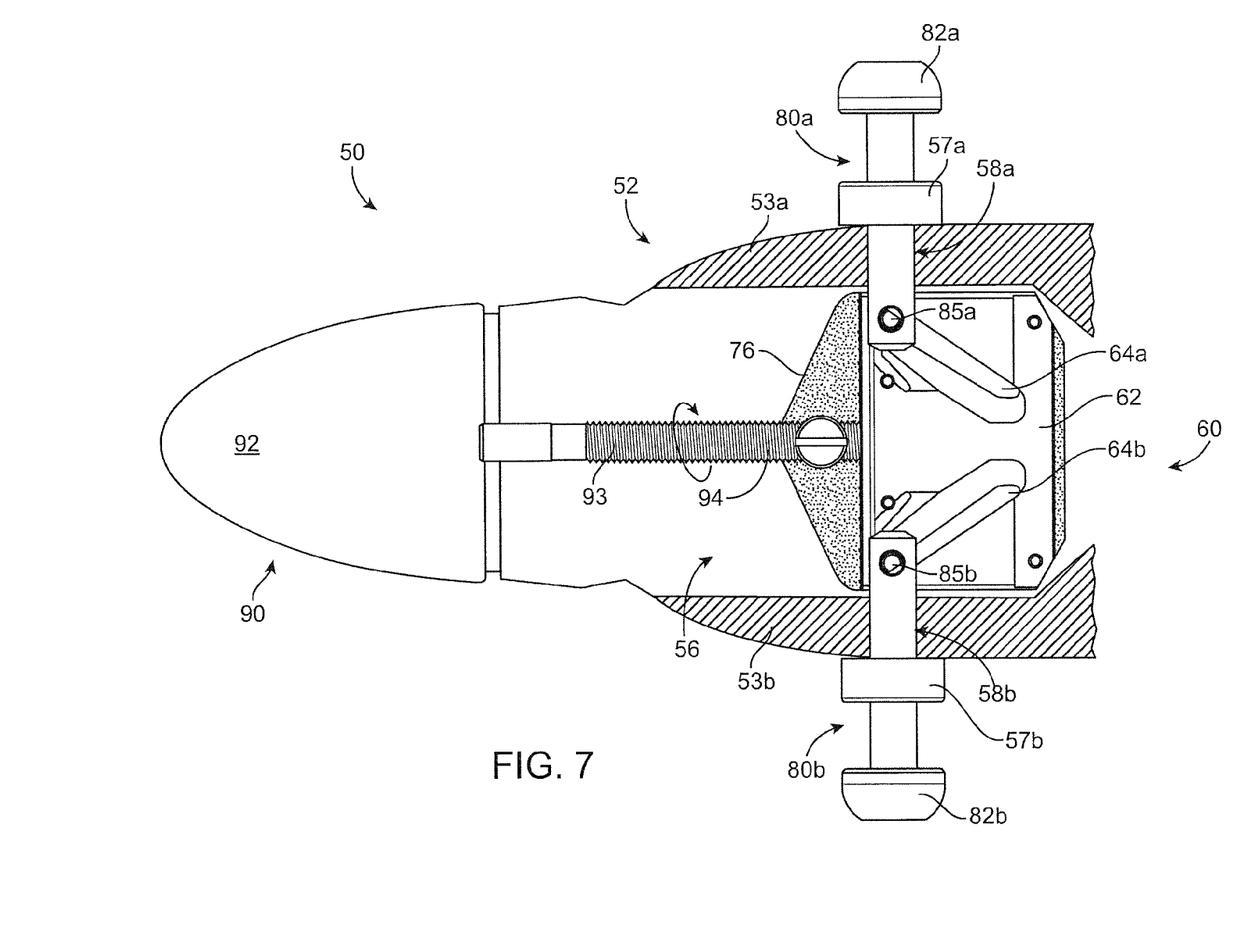
FIG. 7 is a partial cutaway view showing the anchor body in cross-section and the skewer engagement carriage exposed within the drive sleeve.
Figure 8:
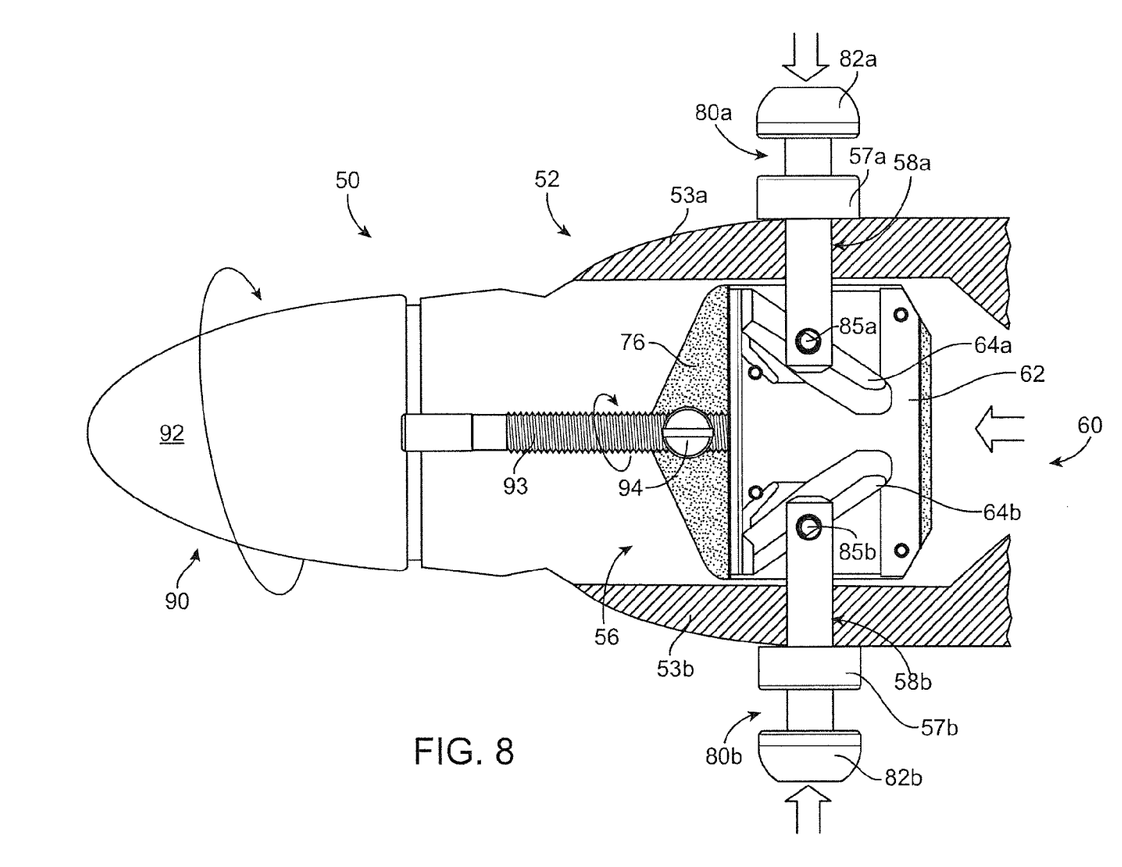
FIG. 8 is a similar view to that of FIG. 7, but with the pair of skewers partially contracted.
Figure 9:
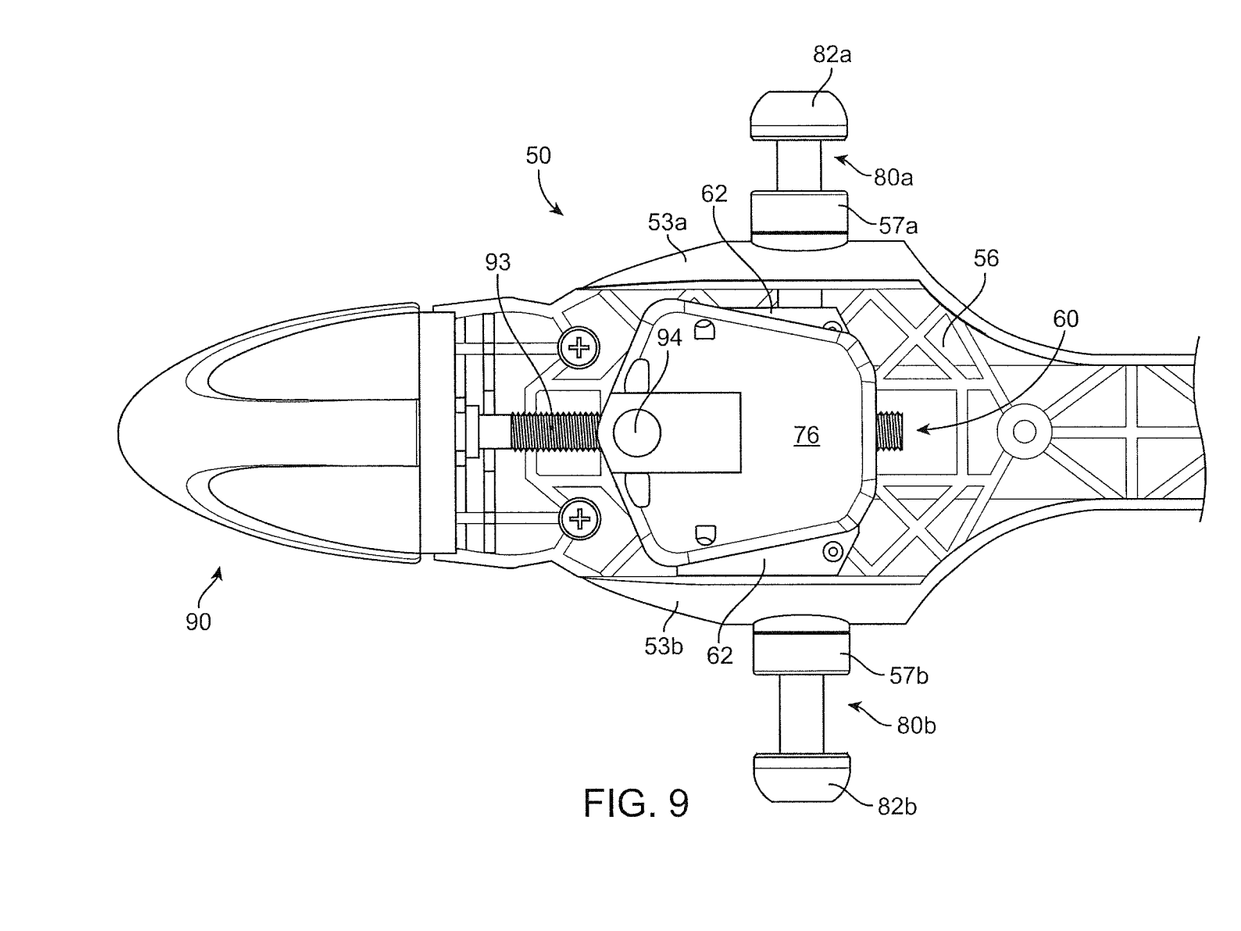
FIG. 9 is a partial cutaway view showing the skewer engagement carriage laterally offset within the drive sleeve so that each of the two skewers extend different lengths outside the anchor body.
Figure 10:
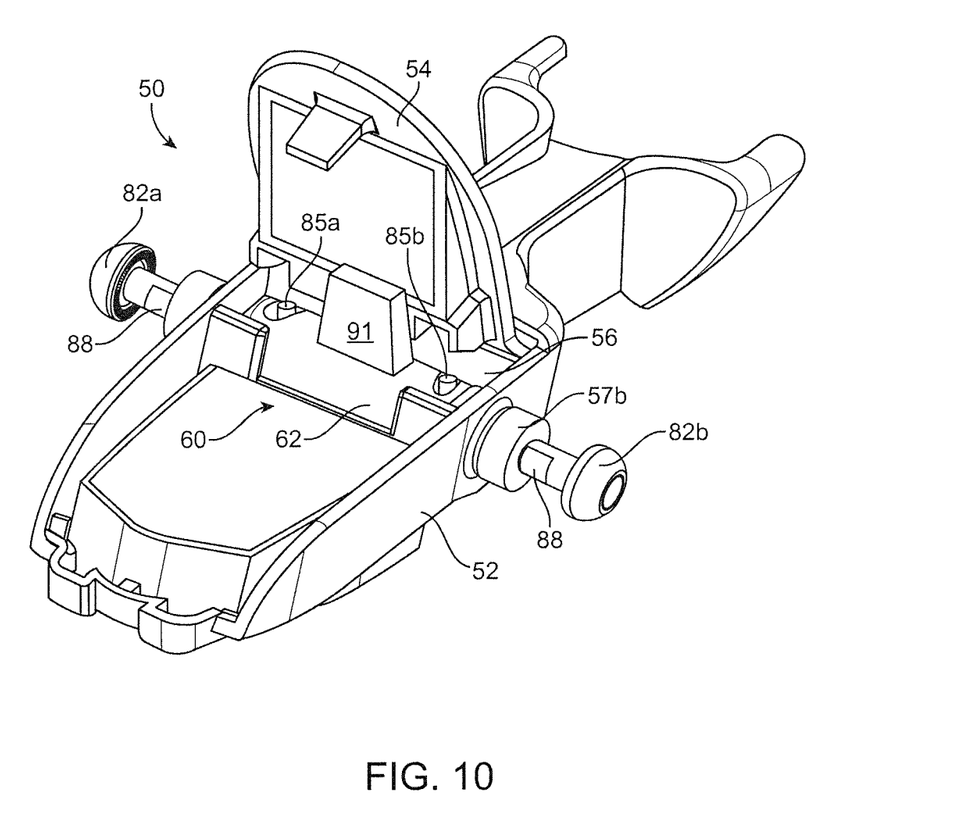
FIG. 10 is a perspective view of a second embodiment of the bicycle fork anchor in which the skewer engagement carriage is cylindrical in nature, with spiral tracks cut therein.
Figure 11:
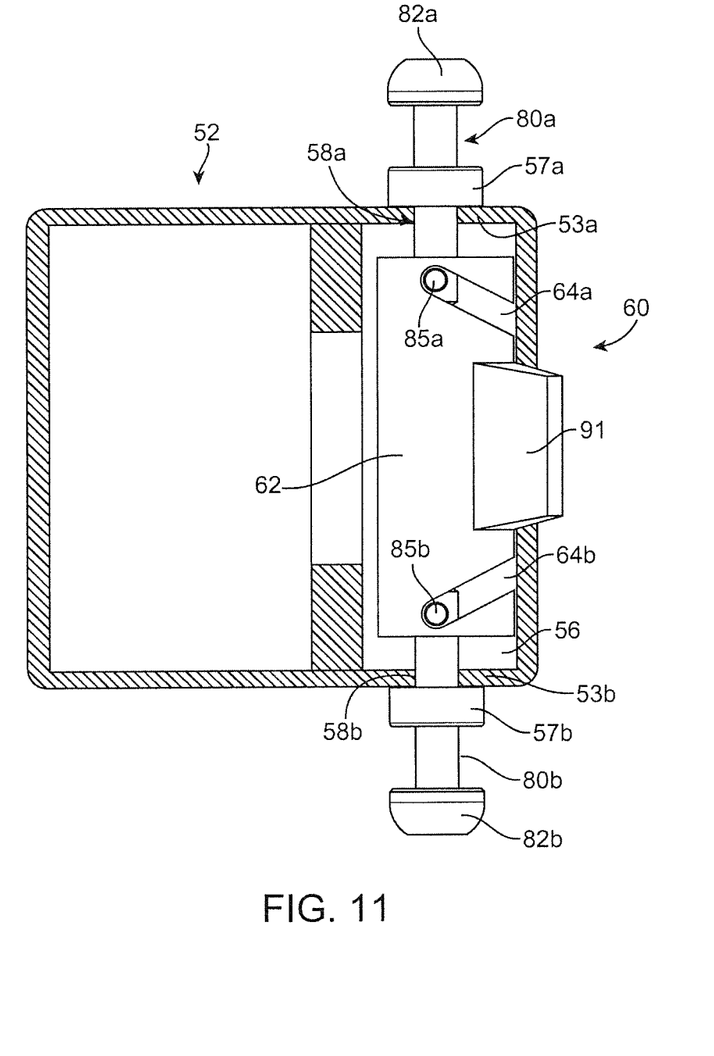
FIG. 11 is a schematic cutaway view showing the anchor body in cross-section and the skewer engagement carriage exposed with a pair of skewers in a fully extended configuration.
Figure 12:
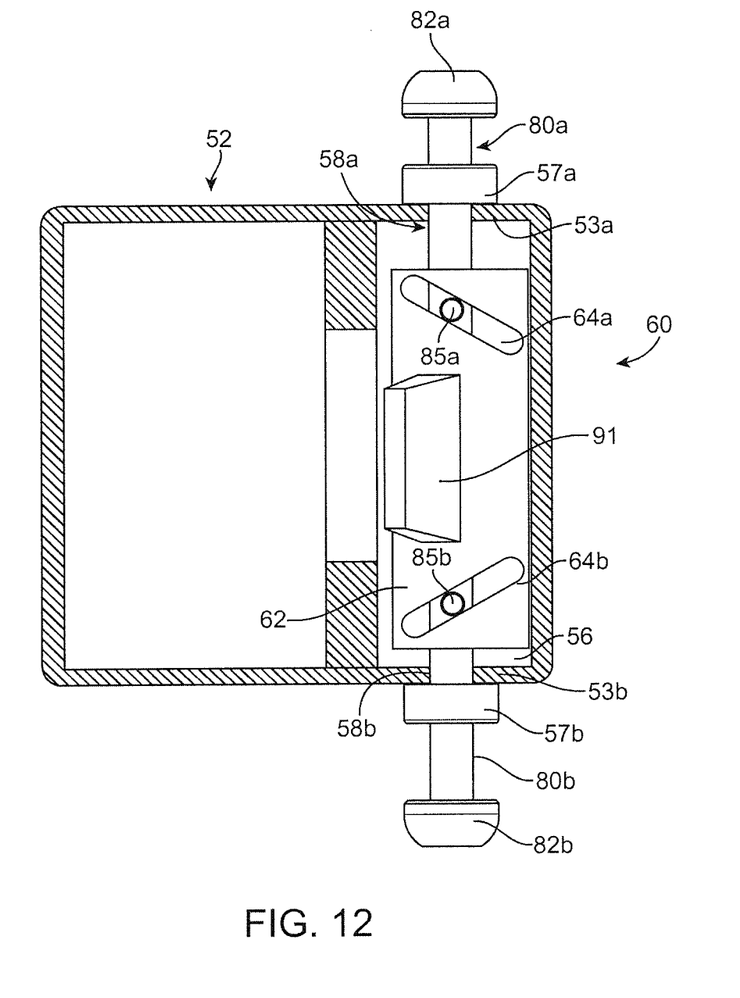
FIG. 12 is similar to FIG. 11, but showing the pair of skewers partially contracted and the skewer engagement carriage partially offset from center for accommodating different thickness fork dropouts.
Figure 13:
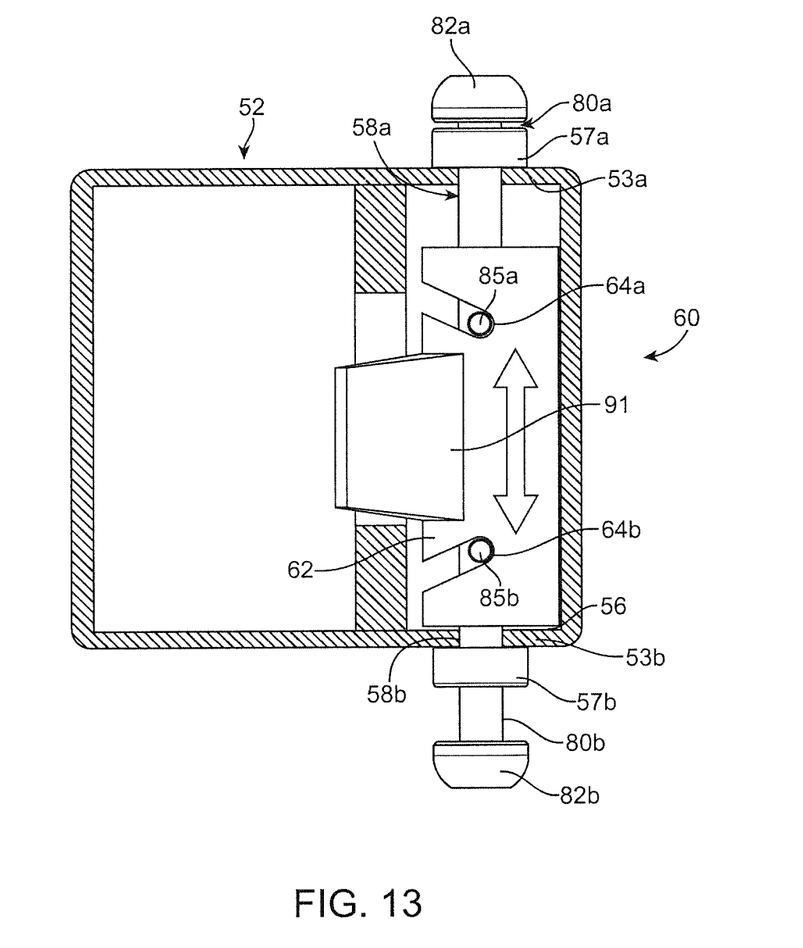
FIG. 13 illustrates a similar arrangement as shown in FIGS. 11 and 12, but with the pair of forks fully contracted and the skewer engagement carriage fully laterally offset to one side for imposing similar force pinch-securement to each of a pair of different thickness fork dropouts.

One embodiment of a skewer contraction device 60 is illustrated in FIGS. 7-9 and another is depicted in FIGS. 10-12. In FIG. 7, the bicycle fork anchor 50 is shown in a configuration in which the pair of skewers 80 is maximally extended. The skewer contraction device 60 is operably coupled to the engagement portion 84 of each of the pair of skewers 80.

In operation, the drive sleeve 76 is first drawn to the left by the threaded rod's 93 screw action in the barrel nut 94. That action also moves the skewer engagement carriage 62 to the left, past the skewers 80. As the track followers 85 on the skewers are trapped for reciprocation in the obliquely oriented tracks 64, the left-direction movement of the carriage 62 causes the skewers 82 to contract toward one another. As described above, the skewer engagement carriage 62 is also capable of lateral movement (up and down in FIG. 7) within the interior space 56 of the anchor body 52 (within the track formed in the interior of the drive sleeve 76) so that during contractive operation of the skewer contraction device 60, the skewers 80 draw together and simultaneously the skewer engagement carriage 62 can move laterally within the interior space of the anchor body 52. This lateral movement results from one of the two skewers 80 first engaging a thicker of the two dropouts 38. When that happens, further contraction of the two skewers only imparts motion to the opposite skewer until it engages its corresponding thinner dropout 38. After that, further contraction of the skewers and the laterally free-floating nature of the carriage 62 within the anchor body 52 results in like pinch-force being exerted by the two skewer heads 82 on the respective dropouts 39.

The process or sequence for moving from the released configuration of FIG. 7 to the secured configuration of FIG. 9 is illustrated in FIG. 8.

As illustrated, the pair of axially aligned elongate skewers 80 are substantially alike in shape and size. Moreover, each pair of obliquely oriented tracks 64 are oppositely inclined to one another and oriented symmetrically about an axis of symmetry therebetween. In this configuration, upon operation of the skewer contraction device 60, the skewers are drawn equal distances towards one another under the drive force of the sleeve 76.

It should be appreciated that except for friction between the skewer engagement carriage 62 and the drive sleeve 76, the carriage 62 is laterally free-floating within the interior space 56 between the opposite lateral sidewalls 53 of the anchor body 52 in directions parallel to the skewer axis 87. It should be appreciated that the skewer engagement carriage 62 also reciprocates in the direction substantially perpendicular to the lateral travel under the influence of the drive sleeve 76. That is to say, the skewer engagement carriage 62 translates at least in the X-direction under the action of the drive sleeve 76, and can translate in the Y-direction when different thickness dropouts 38 are encountered.

FIGS. 10-12 illustrated a different embodiment of the skewer contraction device 60 having an engagement carriage 62 that is substantially cylindrical in exterior shape and the pair of fixed skewers (except for reciprocation in the channels 58) establish an axle about which the skewer engagement carriage 62 revolves during operation of the skewer contraction device 60. In this embodiment, and as may be appreciated in FIG. 10, the skewers 80 reciprocate in the channels 58 formed in the anchor body 52, but they are prevented from rotation by flats 88 on the skewers 80 which mate with a corresponding flat within the receiving channel 58, preventing rotation thereof.

Again, a pair of symmetric obliquely oriented tracks 64 are provided in the skewer engagement carriage 62 which take the form of opposite direction spiral shaped cutouts or tracks (a right-hand spiral and a left-hand spiral) that are mirror images of one another about an axis of symmetry therebetween. As illustrated, the bicycle fork anchor 50 of FIGS. 10-12 is of more of a clam-shell type construction having a lid or closure member 54 that transitions between open and closed configurations.

Pivotation of the lid 54, which is interconnected with pivot actuator 91 coupled to the cylindrical skewer engagement carriage 62, rotates the carriage 62 for contracting and expanding the pair of skewers 80 relative to one another. Also, as the skewers 80 act as an axle capable of reciprocation within the channels of the skewer access ports 58a and 58b, the skewer engagement carriage 62 laterally free-floats within the anchor body 52 thereby facilitating different extension lengths of the skewers 80 and accommodating different thickness fork prong dropouts 39. Once the skewer heads 82 are positioned against each of the different thickness fork prong dropouts 39, final rotation of the skewer engagement carriage 62 imparts a final, predetermined tightening force to each of the skewer heads 82 against its respective fork prong dropouts 39.

According to the two different examples that have been described and illustrated herein (FIGS. 7-9 and FIGS. 10-12), it can be readily appreciated how the disclosed skewer contraction device 60 uniquely accommodates the imposition of equal pinch-securement force on a pair of bicycle fork dropouts 38 having different thicknesses 39.

Example implementations have been described hereinabove regarding various example embodiments. The example embodiments are intended to constitute non-limiting examples. The subject matter that is intended to be within this disclosure is set forth in the following claims.

The invention claimed is:

1. A bicycle fork anchor that accommodates securing a bicycle fork to a vehicular mounted load carrier in which each of a pair of fork dropouts in respective prongs of the bicycle fork have different thicknesses and each fork dropout is pinch-secured to the anchor with substantially like magnitude force in a secured configuration for bicycle transport, the bicycle fork anchor comprising:
   an anchor body comprising an interior space housing a skewer contraction device, the body having a pair of skewer access ports, each extending through opposite lateral side walls of the anchor body; and
   a pair of axially aligned elongate skewers, each extending through one of the skewer access ports, each skewer having a skewer head located laterally outside the anchor body and an engagement portion located in the interior space of the anchor body,
   wherein the skewer contraction device is operably coupled to the engagement portion of each of the pair of skewers, the skewer contraction device being laterally moveable within the interior space of the anchor body so that during contractive operation of the skewer contraction device the skewers draw together and simultaneously the skewer contraction device moves laterally within the interior space of the anchor body causing the skewers to extend different lengths outside the body and thereby accommodating reception of different thickness fork dropouts on the skewers and causing each fork dropout to be pinch-secured against the anchor body with substantially like magnitude force by the respective skewers in the secured configuration for bicycle transport.

2. The bicycle fork anchor recited in claim 1, wherein the pair of skewer access ports comprise a pair of axially aligned elongate skewer channels extending through the opposite lateral side walls of the anchor body, each of the pair of axially aligned elongate skewers being retained in a respective one of the pair of axially aligned elongate skewer channels for reciprocation respectively therein, each skewer having a longitudinal axis that together establish a skewer axis fixed relative to the anchor body, and
   wherein the skewer contraction device comprises a skewer engagement carriage having a pair of obliquely oriented tracks and each of the pair of skewers comprising a track follower retained within a respective one of the tracks and configured for reciprocation therein as the skewer contraction device is operated.

3. The bicycle fork anchor recited in claim 2, further comprising:
   the pair of axially aligned elongate skewers being substantially alike in shape and size; and
   each of the pair of obliquely oriented tracks are oriented symmetrically, one to the other, and upon operation of the skewer contraction device, the skewers are drawn equal distances toward one another.

4. The bicycle fork anchor recited in claim 3, wherein the skewer engagement carriage is laterally free-floating within the interior space between the opposite lateral side walls of the anchor body in directions parallel to the skewer axis.

5. The bicycle fork anchor recited in claim 4, wherein the skewer engagement carriage is substantially cylindrical in exterior shape and the pair of skewers establish an axle about which the skewer engagement carriage revolves during operation of the skewer contraction device.

6. The bicycle fork anchor as recited in claim 5, wherein the pair of symmetric obliquely oriented tracks in the skewer engagement carriage are opposite direction spirals relative to one another about an axis of symmetry therebetween.

7. The bicycle fork anchor recited in claim 2, wherein the skewer engagement carriage reciprocates in a direction substantially perpendicular to the skewer axis during operation of the skewer contraction device.

8. The bicycle fork anchor recited in claim 7, wherein the pair of symmetric obliquely oriented tracks in the skewer engagement carriage are oppositely inclined relative to one another about an axis of symmetry therebetween.

9. The bicycle fork anchor recited in claim 7, wherein the skewer engagement carriage laterally reciprocates within a driving sleeve in a direction substantially parallel to the skewer axis during operation of the skewer contraction device.

10. The bicycle fork anchor as recited in claim 9, wherein the driving sleeve is operably coupled to a rotary actuator that upon rotation by an operator moves the driving sleeve and skewer engagement carriage in a direction substantially perpendicular to the skewer axis.

11. The bicycle fork anchor as recited in claim 10, wherein the rotary actuator is interconnected to the driving sleeve by an externally threaded rod extending from an operator graspable knob to an internally threaded barrel nut retained on the driving sleeve.

12. A bicycle fork anchor that accommodates securing a bicycle fork to a vehicular mounted load carrier in which each of a pair of fork dropouts in respective prongs of the bicycle fork have different thicknesses and each fork dropout is secured to the anchor with substantially like magnitude force in a secured configuration for bicycle transport, the bicycle fork anchor comprising:

an anchor body comprising an interior space housing a skewer contraction device, the body having a pair of skewer access ports, each extending through opposite lateral side walls of the anchor body; and     a pair of axially aligned elongate skewers, each extending through one of the skewer access ports, each skewer having a skewer head located laterally outside the anchor body and an engagement portion located in the interior space of the anchor body,     wherein the skewer contraction device operably is coupled to the engagement portion of each of the pair of skewers and the skewer contraction device being laterally moveable within the interior space of the anchor body so that during contractive operation of the skewer contraction device the skewers draw together and simultaneously the skewer contraction device moves laterally within the interior space of the anchor body causing the skewers to extend different lengths outside the body and thereby accommodating reception of different thickness fork dropouts on the skewers and causing each fork dropout to be secured against the anchor body with substantially like magnitude force by the respective skewers in the secured configuration for bicycle transport.

13. The bicycle fork anchor recited in claim 12, wherein the pair of skewer access ports comprise a pair of axially aligned elongate skewer channels extending through the opposite lateral side walls of the anchor body, each of the pair of axially aligned elongate skewers being retained in a respective one of the pair of axially aligned elongate skewer channels for reciprocation respectively therein, each skewer having a longitudinal axis that together establish a skewer axis fixed relative to the anchor body, and     wherein the skewer contraction device comprises a skewer engagement carriage having a pair of obliquely oriented tracks and each of the pair of skewers comprising a track follower retained within a respective one of the tracks and configured for reciprocation therein as the skewer contraction device is operated.

14. The bicycle fork anchor recited in claim 13, further comprising:

the pair of axially aligned elongate skewers being substantially alike in shape and size; and     each of the pair of obliquely oriented tracks are oriented symmetrically, one to the other, and upon operation of the skewer contraction device, the skewers are drawn equal distances toward one another.

15. The bicycle fork anchor recited in claim 14, wherein the skewer engagement carriage is laterally free-floating within the interior space between the opposite lateral side walls of the anchor body in directions parallel to the skewer axis.

16. The bicycle fork anchor recited in claim 15, wherein the skewer engagement carriage is substantially cylindrical in exterior shape and the pair of skewers establish an axle about which the skewer engagement carriage revolves during operation of the skewer contraction device.

17. The bicycle fork anchor as recited in claim 16, wherein the pair of symmetric obliquely oriented tracks in the skewer engagement carriage are opposite direction spirals relative to one another about an axis of symmetry therebetween.

18. The bicycle fork anchor recited in claim 13, wherein the skewer engagement carriage reciprocates in a direction substantially perpendicular to the skewer axis during operation of the skewer contraction device.

19. The bicycle fork anchor recited in claim 18, wherein the pair of symmetric obliquely oriented tracks in the skewer engagement carriage are oppositely inclined relative to one another about an axis of symmetry therebetween.

20. The bicycle fork anchor recited in claim 18, wherein the skewer engagement carriage laterally reciprocates within a driving sleeve in a direction substantially parallel to the skewer axis during operation of the skewer contraction device.

21. The bicycle fork anchor as recited in claim 20, wherein the driving sleeve is operably coupled to a rotary actuator that upon rotation by an operator moves the driving sleeve and skewer engagement carriage in a direction substantially perpendicular to the skewer axis.

22. The bicycle fork anchor as recited in claim 21, wherein the rotary actuator is interconnected to the driving sleeve by an externally threaded rod extending from an operator graspable knob to an internally threaded barrel nut retained on the driving sleeve.

\* \* \* \* \*